US012552348B2

United States Patent
Braun

(10) Patent No.: US 12,552,348 B2
(45) Date of Patent: Feb. 17, 2026

(54) ACTUATING DEVICE FOR A BRAKE-BY-WIRE BRAKE SYSTEM OF A MOTOR VEHICLE, IN PARTICULAR OF A TILTING VEHICLE

(71) Applicant: Bayerische Motoren Werke Aktiengesellschaft, Munich (DE)

(72) Inventor: Christian Braun, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 49 days.

(21) Appl. No.: 18/292,447

(22) PCT Filed: Jun. 8, 2022

(86) PCT No.: PCT/EP2022/065552
§ 371 (c)(1),
(2) Date: Jan. 26, 2024

(87) PCT Pub. No.: WO2023/006286
PCT Pub. Date: Feb. 2, 2023

(65) Prior Publication Data
US 2024/0343340 A1    Oct. 17, 2024

(30) Foreign Application Priority Data
Jul. 28, 2021  (DE) ............ 10 2021 119 504.7

(51) Int. Cl.
*B60T 7/04*       (2006.01)
*B60T 7/08*       (2006.01)
(Continued)

(52) U.S. Cl.
CPC ............. *B60T 7/042* (2013.01); *B60T 7/085* (2013.01); *B60T 8/1706* (2013.01); *B60T 8/171* (2013.01);
(Continued)

(58) Field of Classification Search
CPC ........ B60T 7/042; B60T 7/085; B60T 8/1706; B60T 8/171; B60T 8/172; B62L 3/02;
(Continued)

(56) References Cited

U.S. PATENT DOCUMENTS

| 2012/0007419 A1 | 1/2012 | Sellinger et al. |
| 2013/0009456 A1 | 1/2013 | Schiel |

(Continued)

FOREIGN PATENT DOCUMENTS

| DE | 102 30 865 A1 | 2/2004 |
| DE | 10 2006 054 094 A1 | 6/2008 |

(Continued)

OTHER PUBLICATIONS

International Search Report (PCT/ISA/210) issued in PCT Application No. PCT/EP2022/065552 dated Oct. 11, 2022 with English translation (4 pages).

(Continued)

*Primary Examiner* — Joseph Brown
(74) *Attorney, Agent, or Firm* — Crowell & Moring LLP

(57) ABSTRACT

An actuating device for a brake-by-wire brake system of a motor vehicle includes at least one actuating element to be actuated by muscular force and is transferable from an unactuated rest position into at least one working position. A control unit includes at least one sensor element, by way of which the position of the actuating element is able to be sensed, and a braking force of a brake actuated by the control unit is settable depending on the working position, sensed by the sensor, of the actuating element. The actuating device has a restoring unit with which the actuating element is preloaded or able be preloaded by a restoring force into the unactuated rest position, wherein the restoring force of the (Continued)

restoring unit and the braking force increase as the deviation of the working position from the rest position of the actuating element increases.

17 Claims, 1 Drawing Sheet

(51) Int. Cl.
| | | |
|---|---|---|
| | *B60T 8/17* | (2006.01) |
| | *B60T 8/171* | (2006.01) |
| | *B60T 8/172* | (2006.01) |
| | *B62L 3/02* | (2006.01) |
| | *B62L 3/04* | (2006.01) |
| | *G05G 5/05* | (2006.01) |

(52) U.S. Cl.
CPC ............... *B60T 8/172* (2013.01); *B62L 3/02* (2013.01); *B62L 3/04* (2013.01); *G05G 5/05* (2013.01); *B60T 2220/04* (2013.01); *G05G 2505/00* (2013.01)

(58) Field of Classification Search
CPC ... B62L 3/04; G05G 1/04; G05G 1/30; G05G 1/38; G05G 1/44; G05G 5/05; G05G 2505/00
See application file for complete search history.

(56) References Cited

U.S. PATENT DOCUMENTS

| | | | |
|---|---|---|---|
| 2013/0086900 A1* | 4/2013 | Kim | .................. B60T 7/042 60/533 |
| 2013/0162013 A1 | 6/2013 | Drumm | |
| 2013/0247557 A1* | 9/2013 | Konig | ................. B60T 11/18 60/534 |
| 2020/0001711 A1* | 1/2020 | Burke | ................... G05G 5/05 |
| 2020/0151968 A1* | 5/2020 | Suzuki | .................. B62K 23/06 |
| 2020/0353908 A1* | 11/2020 | Street | .................. B60T 8/4086 |
| 2022/0205812 A1* | 6/2022 | Kim | .................. B60T 7/042 |

FOREIGN PATENT DOCUMENTS

| | | |
|---|---|---|
| DE | 10 2010 000 882 A1 | 7/2010 |
| DE | 10 2014 200 362 A1 | 7/2015 |
| DE | 10 2014 112 015 A1 | 2/2016 |
| DE | 10 2018 222 075 A1 | 6/2020 |

OTHER PUBLICATIONS

German-language Written Opinion (PCT/ISA/237) issued in PCT Application No. PCT/EP2022/065552 dated Oct. 11, 2022, with English translation (8 pages).
German Search Report issued in German Application No. 10 2021 119 504.7 dated Sep. 29, 2021, with partial English translation (17 pages).

* cited by examiner

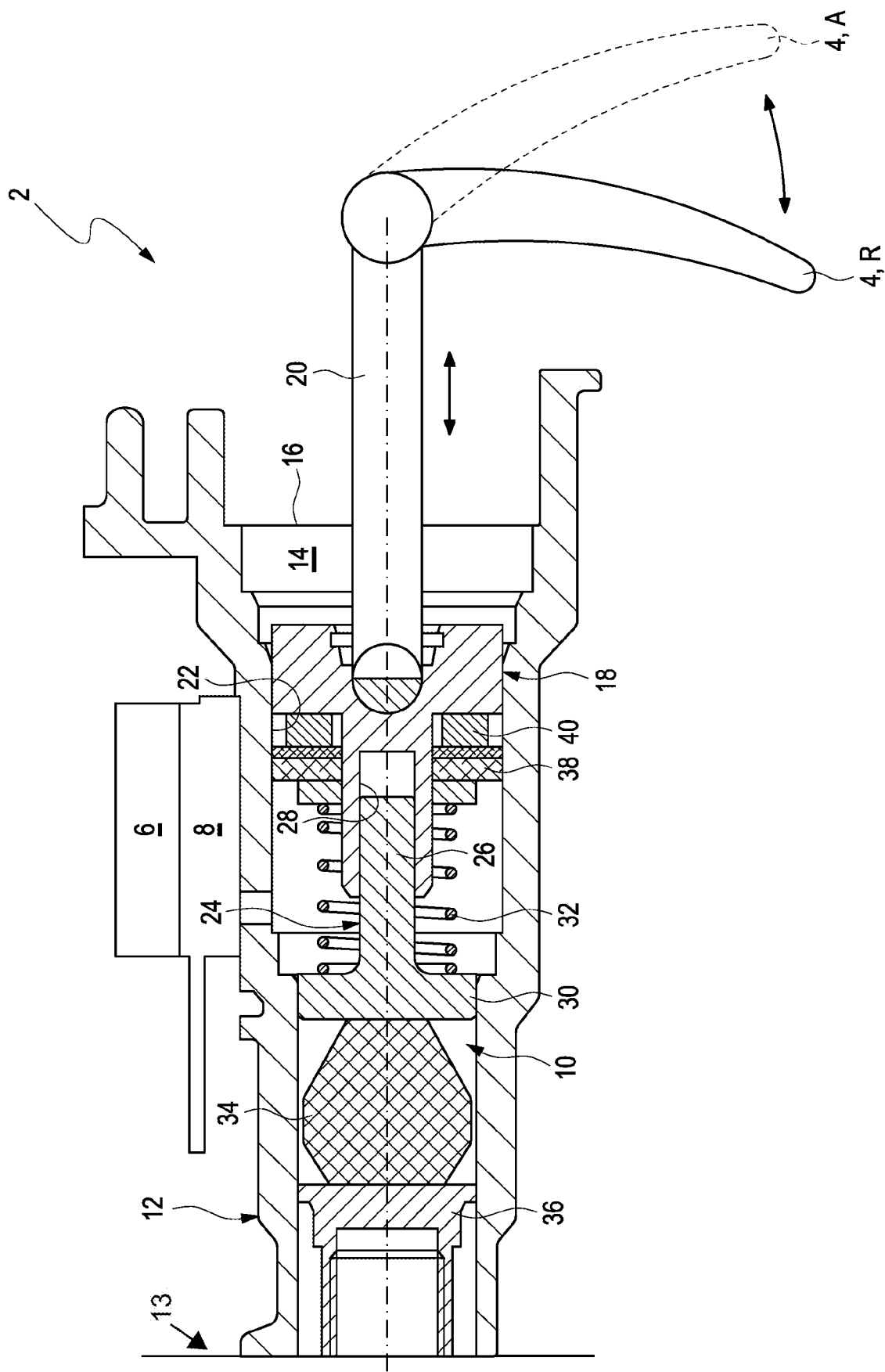

ACTUATING DEVICE FOR A BRAKE-BY-WIRE BRAKE SYSTEM OF A MOTOR VEHICLE, IN PARTICULAR OF A TILTING VEHICLE

BACKGROUND AND SUMMARY

The invention relates to an actuating device for a brake-by-wire brake apparatus of a motor vehicle, in particular of a tilting vehicle.

In motor vehicles, there is currently the development of equipping the motor vehicles with a brake-by-wire brake. This is understood to mean brakes which are actuated by means of electronic signalling for building up a braking force. In such a case, these so-called brake-by-wire brakes replace the actuation of the brake by means of hydraulics.

However, for reasons of fail-safety, at least one brake still has to be configured in the form of a hydraulic brake in tilting vehicles. The wheel to be braked here usually comprises a front wheel, the rear wheel being able to be braked by a brake-by-wire brake.

The brake-by-wire brake is actuated virtually without resistance, since no hydraulic pressure has to be counteracted. Here, it is difficult for a driver of the motor vehicle, in particular of the tilting vehicle, when actuating an actuating element, to be provided with a realistic sensation of the braking action in the manner they are familiar with from a hydraulic brake.

The object of an exemplary embodiment of the invention is to provide an actuation of a brake-by-wire brake apparatus of a motor vehicle, in particular of a tilting vehicle, with which a braking action triggered by actuation of the actuating element is able to be fed back to a driver of a motor vehicle in a simplified manner.

This object is achieved by means of an actuating device for a brake-by-wire brake apparatus of a motor vehicle, in particular of a tilting vehicle, comprising at least one actuating element which is actuatable by muscle power and which is transferable by muscle power from a non-actuated rest position to at least one working position, comprising at least one control unit which comprises at least one sensor element, said sensor element being able to be used to indirectly or directly detect the position of the actuating element, and which is able to set a braking force of a brake, which is actuatable by the control unit, in dependence on the working position of the actuating element, said working position being detected by the sensor element, and comprising at least one restoring unit which is or can be used to preload the actuating element with a restoring force into the non-actuated rest position, wherein the restoring force of the restoring unit and the braking force set at the brake by the control unit increase as the deviation of the respective working position from the rest position of the actuating element increases.

Due to the fact that the actuating device comprises a restoring unit in which the restoring force increases as the deviation of the respective working position from the rest position of the actuating element increases, the user of the motor vehicle, who actuates the actuating element by muscle force, immediately experiences feedback.

Here, the restoring force of the restoring unit may be configured to correspond to the braking force at the brake. Due to the increase in the restoring force of the restoring unit in dependence on the increase in the deviation of the respective working position from the rest position of the actuating element, the actuating device simulates a hydraulic system.

The actuating element may be a manually actuatable actuating element or a foot-actuatable actuating element. If the actuating element is manually actuatable, this may for example comprise a hand brake. If the actuating element is actuatable by a foot, this may for example comprise a pedal.

The motor vehicle can fundamentally comprise any desired motor vehicle. By way of example, it may comprise a passenger vehicle, a truck, a transport vehicle or a tilting vehicle.

A tilting vehicle is understood to mean bicycles, motorcycles or motor vehicles similar to motorcycles, such as motor scooters, in particular two-wheeled, three-wheeled or four-wheeled motor scooters, scooters, tiltable trikes, quad bikes or the like.

Also contemplated are embodiments of the actuating device in which the restoring force of the restoring unit and the braking force set at the brake by the control unit increase linearly or progressively as the deviation of the respective working position from the rest position of the actuating element increases.

If the restoring force and the braking force increase linearly as the deviation of the respective working position from the rest position of the actuating element increases, a hydraulic system can be simulated in a simple manner.

If the restoring force and the braking force increase progressively, the actuating device can be of compact form.

A deviation of the respective working position from the rest position of the actuating element can be understood to mean an actuation travel. By way of example, the actuating element may be transferred along a translational direction, thus execute a linear movement, or be rotated around a bearing unit, thus perform a rotational movement about an axis of rotation. In such a case, in the event of a linear movement the deviation from the rest position in the direction of the working position comprises the linear travel, and in the event of a rotation about an axis of rotation for example a change in angle.

In principle, it is contemplated, for example if the actuating element is rotatable around a bearing unit, for the restoring unit and the bearing unit to comprise a common, single-piece component and for the restoring unit to, for example, comprise a torsion spring or the like.

In addition, in one embodiment of the actuating device, at least one housing body may be provided which is arranged on or in a frame element of the motor vehicle and fixed in a positionally fixed manner with respect to the frame element or which is formed by a portion of the frame element, said portion having a cavity which is accessible from the outside, at least from one side, via an opening in the housing body and in which the restoring unit is arranged and indirectly or directly connected to the actuating element.

In this way, the restoring unit is spatially separable from the actuating element and is held by a housing body and protected against soiling.

In order for the transferring of the actuating element from the rest position to a working position to be transformed into a translational movement, one refinement of the last-mentioned embodiment provides for the actuating device to comprise at least one piston which is arranged in the cavity between the restoring unit and the opening, said piston having a cross section which corresponds, in particular is complementary, to the cross section of a hollow-cylindrical portion of the cavity, being supported by one end on the restoring unit and being connected to the actuating element by the end facing away from the restoring unit, the kinematics of said piston being coupled to the actuating element.

Due to the fact that the piston is kinematically coupled to the actuating element and due to the fact that the piston has a cross section which corresponds to the cross section of the hollow-cylindrical portion of the cavity, it is possible for the piston to be moved within the cavity, in particular in the region of the hollow-cylindrical portion, so as to be guided along a translational direction.

In one refinement of the last-mentioned embodiment, it has proven to be advantageous for the piston to be arranged in a rest position in the rest position of the actuating element and to be transferred to a working position corresponding to the working position when the actuating element is transferred to the at least one working position, and/or for the restoring force acting on the piston on the part of the restoring unit to be minimal in the rest position and to be increased in the at least one working position with respect to the rest position.

In such a case, the kinematics of the actuating element may be transferred to the piston in such a way that when transferring the actuating element from the rest position to the working position the restoring force of the restoring unit is achieved in a transfer of the piston from the rest position to the working position, wherein the transferring of the piston from the rest position to the working position increases the restoring force acting on the piston and thus on the actuating element.

In order to ensure that the movement and the forces are transmitted between the actuating element and the piston, one exemplary embodiment of the actuating device comprises a coupling mechanism which is rotatably fixed on the piston and rotatably fixed on the actuating element and can be used to transmit a movement of the actuating element to the piston in order to move the piston.

Due to the fact that the coupling mechanism is rotatably fixed both on the piston and on the actuating element, transmission of the actuating force on the part of the actuating element, and vice versa, is made possible without tilting.

In principle, it is contemplated for the sensor element of the control unit to directly detect a movement of the actuating element or of the piston. It has proven to be advantageous for the control unit to comprise at least one magnet element which is fixed in a positionally fixed manner on the piston and the position of which in the cavity is detectable by the sensor of the control unit, wherein the restoring force of the restoring unit and the braking force set at the brake by the control unit increase with increasing deviation of the working position of the piston from the rest position.

In such a case, the sensor may be arranged in the cavity of the housing body or outside the cavity of the housing body, so as to bear against the housing body from the outside.

If the sensor bears against the housing body outside of the cavity, it has proven to be advantageous for the control unit to comprise at least one magnet element which is fixed in a positionally fixed manner on the piston and the position of which in the cavity is detectable by the sensor of the control unit, wherein the restoring force of the restoring unit and the braking force set at the brake by the control unit increase with increasing deviation of the working position of the piston from the rest position.

Due to the fact that the magnet element is fixed in a positionally fixed manner on the piston, the magnet element is transferable together with the piston from a rest position to a working position. In such a case, this change in position or the exact position of the magnet element is detectable by the sensor. In dependence on the position of the magnet element, which is dependent on the position of the piston, whose position is in turn dependent on the working position of the actuating element, a corresponding braking force can be set at the brake by the control unit.

When using a magnet element, the sensor can be implemented in a simple and cost-effective manner if the sensor of the control unit comprises a Hall sensor.

In order to preload the actuating element into the rest position in a simple and cost-effective manner, it has proven to be advantageous for the restoring unit to comprise at least one plunger element, a bar-like projection of which engages into a cutout in the piston, said cutout being of corresponding, in particular complimentary, form to the cross section of the projection, and for the restoring unit to comprise at least one spring element which is supported on a plate portion of the plunger element and also on the piston and which surrounds the bar-like projection of the plunger element.

Due to the fact that the plunger element comprises a bar-like projection which engages into a cutout in the piston, said cutout being of corresponding, in particular complementary, form to the cross section of the projection, the plunger element and the piston are guidable in the case of a relative movement with respect to one another. Due to the fact that a spring element is arranged between the plate portion of the plunger element and the piston, when the piston is transferred from the rest position to the working position the spring element is compressed and, in this way, counteracts the movement of the piston and thus the actuating element by way of a linearly increasing restoring force.

Furthermore, one refinement of the last-mentioned embodiment provides for the restoring unit to comprise at least one compression body, in particular an elastomer, which is arranged on that side of the plunger element which faces away from the piston, and which is supported on the plunger element and also on a housing boundary, and/or for the restoring unit to comprise at least one insulator fixed on the piston, and for the cavity to be closed, in particular entirely, with respect to the sealing element on the side facing away from the opening.

The provision of a compression body means that, in addition to the provision of the spring element, an additional element is proposed which acts with a corresponding restoring force in the direction of the piston in the event of compression.

This effect can be further enhanced if the insulator is fixed to the piston and if the cavity is closed entirely with respect to the insulator on the side facing away from the opening. In this way, transferring the piston from the rest position to the working position results in a compression of the gas located in the cavity, as a result of which an additional restoring force is generated counter to the direction for transferring the piston from the rest position to the working position.

In addition, the object can be achieved by means of a motor vehicle, in particular a tilting vehicle, comprising an actuating device having at least one of the aforementioned features.

Further features, details and advantages of the invention will emerge from the attached patent claims, from the drawing and from the following description of a preferred embodiment of the actuating device.

BRIEF DESCRIPTION OF THE DRAWING

FIG. 1 is a sectional view of a first exemplary embodiment of the actuating device.

DETAILED DESCRIPTION OF THE DRAWING

FIG. 1 shows an exemplary embodiment of an actuating device, denoted as a whole by the reference designation 2, for a brake-by-wire brake apparatus of a motor vehicle. The actuating device 2 comprises an actuating element 4 which is actuatable by muscle force. The actuating element 4 is transferable by muscle force from a non-actuated rest position R to at least one working position A.

In addition, the actuating device 2 comprises a control unit 6 which comprises at least one sensor element 8 that can be used to indirectly or directly detect the position of the actuating element 4. In the exemplary embodiment shown in FIG. 1, the position of the actuating element 4 is indirectly detectable by the control unit 6, in particular by the at least one sensor element 8, which will be discussed in more detail later.

In dependence on the position of the actuating element 4, the control unit 6 is able to set a braking force of a brake (not illustrated in the figures), which is actuatable by the control unit 6, in dependence on the working position A of the actuating element 4, said working position being detected by the sensor element 8.

In order to return the actuating element 4 to the non-actuated rest position R, the actuating device 2 comprises a restoring unit 10. The restoring force of the restoring unit 10 and the braking force set at the brake by the control unit 6 correspond to the muscle force, in particular to the position of the actuating element 4. As the deviation of the working position A of the actuating element from the rest position R increases, the restoring force of the restoring unit 10 and the braking force at the brake also increase.

In the exemplary embodiment shown in FIG. 1, the actuating device 2 comprises a housing body 12 in which the restoring unit 10 is arranged. In the exemplary embodiment shown in FIG. 1, the housing body 12 is formed by a frame element 13 of the motor vehicle.

A cavity 14 is formed in the housing body 12, the restoring unit 10 being arranged in said cavity on a side facing away from an opening 16 in the housing body 12. Arranged in the cavity 14 between the restoring unit 10 and the opening 16 in the housing body 12 is a piston 18 which is coupled to the actuating element 4 via a coupling mechanism 20. The piston 18 has a cross section which is of corresponding, in particular complementary, form to a cross section of a hollow-cylindrical portion 22 of the cavity 14. In this way, when being transferred along a transfer direction, the piston 18 is guided by the inner wall of the cavity 14, at least in the region of the hollow-cylindrical portion 22.

With regard to its kinematics, the piston 18 is coupled to the actuating element 4 via the coupling mechanism 20. In this way, the piston 18 is transferable from a rest position, in which the actuating element 4 is also in the rest position R (as illustrated in FIG. 1), to a working position when the actuating element 4 is transferred to the working position A (not illustrated in the figure).

The piston 18 is arranged in the cavity 14 so as to bear directly against the restoring unit 10 by way of a side facing away from the opening 16. The restoring unit 10 comprises a plunger element 24 which comprises a bar-like projection 26 that engages into a cutout 28 in the piston 18, said cutout being of corresponding, in particular complementary, form to the cross section of the projection 26.

In addition, the plunger element 24 comprises a plate portion 30 with which the plunger element 24 is able to be supported on an inner wall of the cavity 14. The restoring unit 10 also comprises a spring element 32 which is supported on the plate portion 30 of the plunger element 24 and also on the piston 18.

In such a case, when the piston 18 is transferred from the rest position to the working position, the spring element 32 is compressed, as a result of which a restoring force counter to the direction of transfer from the rest position to the working position is increased. Here, the movement of the piston 18 in the direction of the restoring unit 10 is additionally guided by the engagement of the bar-like projection 26 of the plunger element 24 into the cutout 28 in the piston 18.

In addition, in the exemplary embodiment shown in FIG. 1, the restoring unit 10 comprises a compression body 34 which is arranged on that side of the plunger element 24 which faces away from the piston 18, and which is supported on the plunger element 24 and a housing boundary 36.

In the exemplary embodiment shown in FIG. 1, the restoring unit 10 also comprises an insulator 38 which is fixed in a positionally fixed manner on the piston 18 and with which the cavity 14 is enclosed on that side of the insulator 38 which faces away from the opening 16, and the magnetic field is not transmitted to the spring element 32.

In order to indirectly detect a position of the actuating element 4, the sensor element 8 is formed by a Hall sensor in the exemplary embodiment shown in FIG. 1. In order to be able to indirectly detect the position of the actuating element 4, a magnet element 40 is arranged on the piston 18, is fixed in a positionally fixed manner on the piston 18, and its position in the cavity 14 is detectable by the sensor element 8.

The mode of action of the actuating device 2 is described briefly below.

When the actuating element 4 is actuated by muscle force, the actuating element 4 is transferred from a rest position R to a working position A. The coupling mechanism 20 connected to the actuating element 4 transmits the movement of the actuating element 4 by transferring the piston 18 from the rest position to the working position. The restoring unit 10 counteracts the moving of the piston 18, a restoring force acting on the piston 18 increasing as the change in position of the piston 18 from the rest position to a working position increases. This can also be experienced at the actuating element 4 by the user, who, in order to transfer the actuating element 4 further from a working position A to a further working position A which is further away from the rest position R, must first overcome the restoring force of the restoring unit 10.

If the bar-like projection 26 of the plunger element 24 is arranged entirely in the cutout 28, in other words is in block form, only the spring rate of the compression body 34 acts during the further movement of the piston 18 until said compression body completely fills the cavity 14 in the housing body 12.

The control unit 6, in particular the sensor element 8, is used to correspondingly increase a braking force of a brake of the brake apparatus as the deflection of the piston 18 from the rest position to the working position increases. In this way, muscle force, restoring force and braking force correspond with one another.

The features of the invention which are disclosed in the preceding description, in the claims and in the drawing can be essential, both individually and in any desired combination, to the implementation of the invention in its various embodiments.

LIST OF REFERENCE DESIGNATIONS

2 Actuating device
4 Actuating element
6 Control unit
8 Sensor element

10 Restoring unit
12 Housing body
14 Cavity
16 Opening
18 Piston
20 Coupling mechanism
22 Hollow-cylindrical portion
24 Plunger element
26 Projection
28 Cutout
30 Plate portion
32 Spring element
34 Compression body
36 Housing boundary
38 Insulator
40 Magnet element
R Rest position
A Working position

What is claimed is:

1. An actuating device for a brake-by-wire brake apparatus of a motor vehicle, comprising:
a housing body having a cavity and an opening into the cavity;
an actuating element which is actuatable by muscle power and which is transferable by the muscle power from a non-actuated rest position to a working position;
a control unit which comprises at least one sensor, said sensor being able to be used to indirectly or directly detect a position of the actuating element, wherein the control unit is configured to set a braking force of a brake, which is actuatable by the control unit, in dependence on the working position of the actuating element, the working position being detected by the sensor;
a restoring unit which is usable to preload the actuating element with a restoring force into the non-actuated rest position, wherein the restoring force of the restoring unit and the braking force set at the brake by the control unit increase as a deviation of the working position from the rest position of the actuating element increases;
a piston which is arranged in the cavity between the restoring unit and the opening, said piston having a cross section which corresponds to a cross section of a hollow-cylindrical portion of the cavity, wherein the piston is supported by one end on the restoring unit and is connected to the actuating element by another end facing away from the restoring unit, kinematics of said piston being coupled to the actuating element;
wherein the restoring unit comprises a plunger element, a bar-shaped projection of which engages into and is moveable relative to a cutout in the piston, said cutout being of corresponding form to a cross section of the projection,
the restoring unit comprises at least one spring which is supported on a plate portion of the plunger element and also on the piston and which surrounds the bar-shaped projection of the plunger element;
the restoring unit comprises at least one elastomeric compression body, which is arranged on a side of the plunger element which faces away from the piston, and which is supported on the plunger element and also on a housing boundary; and
the bar-shaped projection of the plunger element is arrangeable entirely in the cutout in the piston during which only a spring rate of the compression body acts during movement of the piston until the compression body completely fills its respective cross-section of the cavity.

2. The actuating device according to claim 1, wherein the restoring force of the restoring unit and the braking force set at the brake by the control unit increase linearly or progressively as the deviation of the working position from the rest position of the actuating element increases.

3. The actuating device according to claim 1, wherein the housing body is positionally fixed with respect to a frame element of the motor vehicle, and indirectly or directly connected to the actuating element.

4. The actuating device according to claim 1, wherein the piston is arranged in a piston rest position and is transferred to a piston working position corresponding to the working position of the actuating element when the actuating element is transferred to the working position, and/or
the restoring force acting on the piston on a part of the restoring unit is minimal in the rest position and is increased in the working position.

5. The actuating device according to claim 1, further comprising:
a coupler which is rotatably fixed on the piston and rotatably fixed on the actuating element and is usable to transmit a movement of the actuating element to the piston in order to move the piston.

6. The actuating device according to claim 1, wherein
the control unit comprises at least one magnet element which is fixed in a positionally fixed manner on the piston and a position of which in the cavity is detectable by the sensor of the control unit, and
the restoring force of the restoring unit and the braking force set at the brake by the control unit increase with increasing deviation of the piston working position from a rest position of the piston.

7. The actuating device according to claim 6, wherein the sensor of the control unit comprises a Hall sensor.

8. The actuating device according to claim 1, wherein the restoring unit comprises at least one insulator fixed on the piston.

9. An actuating device for a brake-by-wire brake apparatus of a motor vehicle, comprising:
a housing body having a cavity and an opening into the cavity;
an actuating element which is actuatable by muscle power and which is transferable by the muscle power from a non-actuated rest position to a working position;
a control unit which comprises at least one sensor, said sensor being able to be used to indirectly or directly detect a position of the actuating element, wherein the control unit is configured to set a braking force of a brake, which is actuatable by the control unit, in dependence on the working position of the actuating element, the working position being detected by the sensor;
a restoring unit which is usable to preload the actuating element with a restoring force into the non-actuated rest position, wherein the restoring force of the restoring unit and the braking force set at the brake by the control unit increase as a deviation of the working position from the rest position of the actuating element increases;
a piston which is arranged in the cavity between the restoring unit and the opening, said piston having a cross section which corresponds to a cross section of a hollow-cylindrical portion of the cavity, wherein the piston is supported by one end on the restoring unit and is connected to the actuating element by another end facing away from the restoring unit, kinematics of said piston being coupled to the actuating element;

wherein the restoring unit comprises a plunger element moveable relative to the actuating element and the piston, a bar-shaped projection of which engages into and is moveable relative to a cutout in the piston, said cutout being of corresponding form to a cross section of the projection, and the restoring unit comprises at least one spring which is supported on a plate portion of the plunger element and also on the piston and which surrounds the bar-shaped projection of the plunger element;

the restoring unit comprises at least one compression body, which is arranged on a side of the plunger element which faces away from the piston, and which is supported on the plunger element and also on a housing boundary; and, the bar-shaped projection of the plunger element is arrangeable entirely in the cutout in the piston during which only a spring rate of the compression body acts during movement of the piston until the compression body completely fills its respective cross-section of the cavity.

10. The actuating device according to claim 9, wherein the restoring force of the restoring unit and the braking force set at the brake by the control unit increase linearly or progressively as the deviation of the working position from the rest position of the actuating element increases.

11. The actuating device according to claim 9, wherein the housing body is positionally fixed with respect to a frame element of the motor vehicle, and indirectly or directly connected to the actuating element.

12. The actuating device according to claim 9, wherein the piston is arranged in a piston rest position and is transferred to a piston working position corresponding to the working position of the actuating element when the actuating element is transferred to the working position, and/or the restoring force acting on the piston on a part of the restoring unit is minimal in the rest position and is increased in the working position.

13. The actuating device according to claim 9, further comprising:

a coupler which is rotatably fixed on the piston and rotatably fixed on the actuating element and is usable to transmit a movement of the actuating element to the piston in order to move the piston.

14. The actuating device according to claim 9, wherein the control unit comprises at least one magnet element which is fixed in a positionally fixed manner on the piston and a position of which in the cavity is detectable by the sensor of the control unit, and the restoring force of the restoring unit and the braking force set at the brake by the control unit increase with increasing deviation of the piston working position from a rest position of the piston.

15. The actuating device according to claim 14, wherein the sensor of the control unit comprises a Hall sensor.

16. The actuating device according to claim 9, wherein the restoring unit comprises at least one insulator fixed on the piston.

17. The actuating device according to claim 9, wherein the compression body is an elastomer.

* * * * *